US012510856B2

(12) United States Patent

Tetsuno et al.

(10) Patent No.: US 12,510,856 B2
(45) Date of Patent: Dec. 30, 2025

(54) IMAGE FORMING APPARATUS

(71) Applicant: CANON KABUSHIKI KAISHA, Tokyo (JP)

(72) Inventors: Shuichi Tetsuno, Kanagawa (JP); Shunsuke Matsushita, Kanagawa (JP); Hiroko Katagiri, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/808,259

(22) Filed: Aug. 19, 2024

(65) Prior Publication Data

US 2025/0076801 A1 Mar. 6, 2025

(30) Foreign Application Priority Data

Aug. 31, 2023 (JP) ................................ 2023-141754

(51) Int. Cl.

| | |
|---|---|
| ***G03G 15/00*** | (2006.01) |
| ***B41J 2/44*** | (2006.01) |
| ***G03G 15/04*** | (2006.01) |
| ***G03G 15/043*** | (2006.01) |
| ***G03G 15/08*** | (2006.01) |
| ***G03G 21/00*** | (2006.01) |

(52) U.S. Cl.

CPC .......... *G03G 15/5008* (2013.01); *B41J 2/442* (2013.01); *G03G 15/04036* (2013.01); *G03G 15/043* (2013.01); *G03G 15/0844* (2013.01); *G03G 15/0865* (2013.01); *G03G 15/5004* (2013.01); *G03G 21/0064* (2013.01)

(58) Field of Classification Search

CPC ........... G03G 15/04–043; G03G 15/50; G03G 15/5008; G03G 15/0844; B41J 2/44–455

See application file for complete search history.

(56) References Cited

U.S. PATENT DOCUMENTS 11,287,760 B1 * 3/2022 Takada ............... G06K 15/1209
11,320,762 B1 * 5/2022 Kojima ................ G03G 15/043
(Continued)

FOREIGN PATENT DOCUMENTS

JP H09222754 A 8/1997
JP 2000162835 A 6/2000
(Continued)

*Primary Examiner* — Carla J Therrien
(74) *Attorney, Agent, or Firm* — ROSSI, KIMMS & McDOWELL LLP

(57) ABSTRACT

In an image forming apparatus, in which: a charging member charges an image bearing member; an exposure unit exposes a surface of the image bearing member to develop an electrostatic latent image; and a developer image on the image bearing member is transferred onto a recording material. A control portion is capable of executing a first operation mode for rotating the image bearing member at a first peripheral velocity, the first operation mode being a mode in which the exposure unit exposes the surface of the image bearing member with a first exposure intensity, and a second operation mode for rotating the image bearing member at a second peripheral velocity lower than the first peripheral velocity, the second operation mode being a mode in which the exposure unit exposes the surface of the image bearing member with a second exposure intensity higher than the first exposure intensity.

12 Claims, 6 Drawing Sheets

(56) References Cited

U.S. PATENT DOCUMENTS

| | | | | |
|---|---|---|---|---|
| 2011/0058850 | A1 * | 3/2011 | Shibuya ............ | G03G 15/0216 399/128 |
| 2023/0161282 | A1 | 5/2023 | Ogawa et al. | |

FOREIGN PATENT DOCUMENTS

| | | | |
|---|---|---|---|
| JP | 2013003346 | A | 1/2013 |
| JP | 2022027631 | A | 2/2022 |

* cited by examiner

Low

Mid

Full

IMAGE FORMING APPARATUS

BACKGROUND OF THE INVENTION

Field of the Invention

The present invention relates to an image forming apparatus for forming an image on a recording material by using an electrophotographic system.

Description of the Related Art

An electrophotographic system has been known as an image recording system used for an image forming apparatus such as a laser printer, a copying machine, and a fax machine. The electrophotographic system is a system in which a laser beam is applied to form an electrostatic latent image on a photosensitive drum, and the electrostatic latent image is developed by developer (hereinafter referred to as "toner") as a charged color material, thereby forming a toner image. By transferring and fixing the thus formed toner image onto a recording material, an image is formed on the recording material.

Toner is contained in a developer container, and when image formation is repeated, the toner in the developer container is gradually consumed. Thus, a configuration is well known in which a developer container is detachably attached to an apparatus main body of an image forming apparatus as an independent unit solely or as a part of a process cartridge, and is replaceable as necessary. Then, in recent years, in order to reduce environmental load and reduce print cost, an image forming apparatus has been proposed, which has a configuration in which the developer container is directly replenished with only toner when the remaining amount of toner in the developer container decreases (Japanese Patent Application Publication No. 2022-027631).

SUMMARY OF THE INVENTION

One of causes of image failure such as fogging is toner deterioration. One of causes of toner deterioration is the flowing and stirring of toner in a developer container. In image forming operation, toner in the developer container flows, but toner used for development is a part of toner in the developer container, and most of the toner is not used for development but remains in the developer container. Toner deterioration further progresses when toner is not used for development but continues to remain in the developer container each time image forming operation is performed.

It is an object of the present invention to provide a technology capable of reducing effect of toner deterioration on image formation.

In order to solve the above-mentioned problem, an image forming apparatus in the present invention includes:

an image bearing member configured to rotate;

a charging member configured to come into contact with the image bearing member to charge a surface of the image bearing member;

a charging voltage application portion configured to apply a charging voltage to the charging member;

an exposure unit configured to expose the surface of the image bearing member to form an electrostatic latent image on the surface of the image bearing member;

a developer containing portion configured to contain developer therein;

a developer bearing member configured to bear the developer contained in the developer containing portion, the developer bearing member being configured to rotate and supply the developer to the surface of the image bearing member;

a drive portion configured to drive the image bearing member and the developer bearing member; and a control portion configured to control the drive portion, the charging voltage application portion, and the exposure unit, wherein the image forming apparatus transfers a developer image, which is obtained by developing the electrostatic latent image by using developer borne by the developer bearing member, onto a recording material to form an image on the recording material, and wherein the control portion is capable of executing following modes:

a first operation mode for rotating the image bearing member at a first peripheral velocity, the first operation mode being a mode in which the exposure unit exposes the surface of the image bearing member with a first exposure intensity; and a second operation mode for rotating the image bearing member at a second peripheral velocity lower than the first peripheral velocity, the second operation mode being a mode in which the exposure unit exposes the surface of the image bearing member with a second exposure intensity higher than the first exposure intensity.

According to the present invention, effect of toner deterioration on image formation can be reduced.

Further features of the present invention will become apparent from the following description of exemplary embodiments with reference to the attached drawings.

DESCRIPTION OF THE EMBODIMENTS

Example 1

Figure 1:
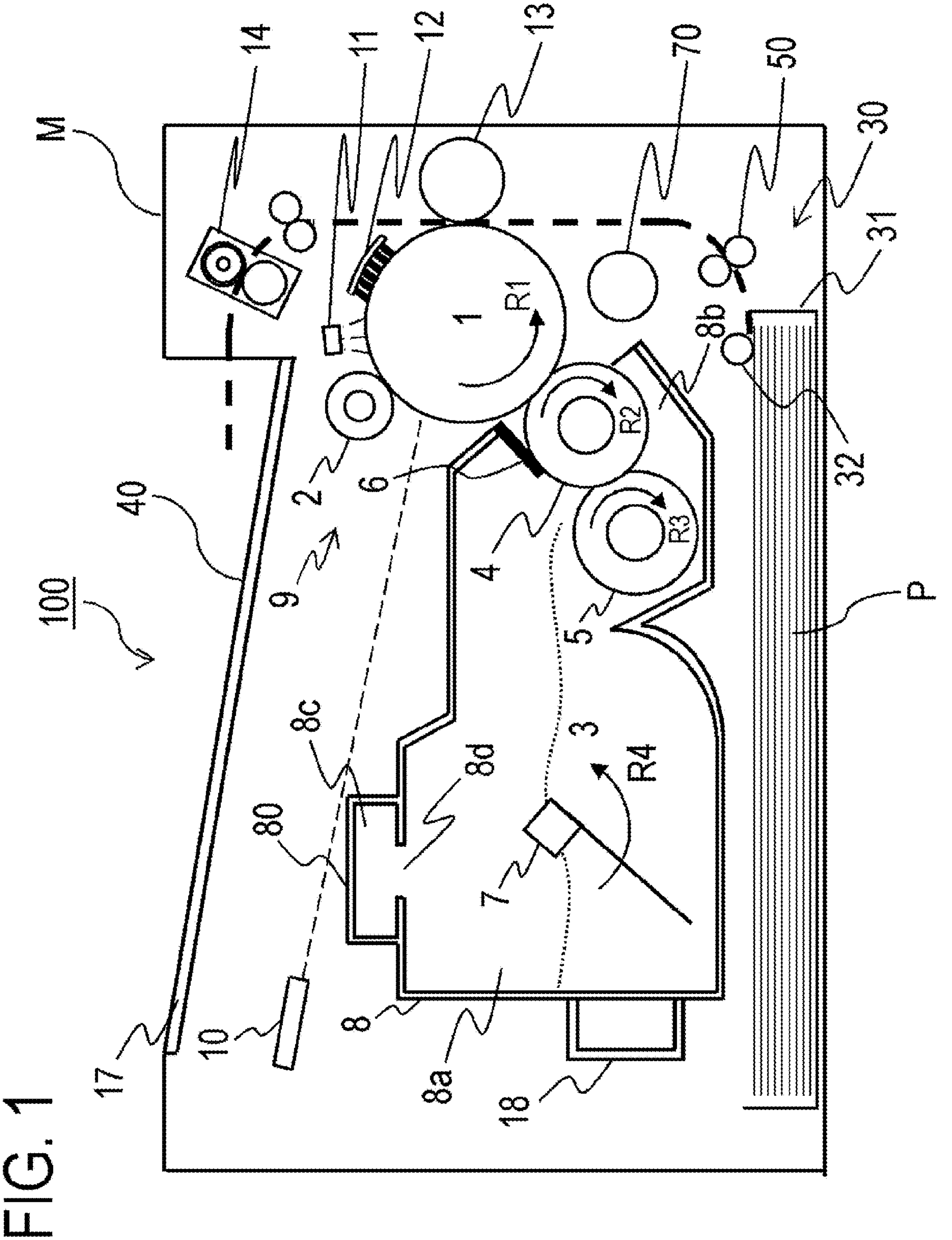
FIG. 1 is an explanatory diagram of an image forming apparatus according to an example of the present invention.

Referring to the drawings, modes for embodying the present invention are exemplarily described in detail below on the basis of examples. However, the dimensions, materials, shapes, and relative arrangements of components described in the embodiments should be changed as appropriate depending on configurations and various conditions of an apparatus to which the present invention is applied. In other words, the dimensions, materials, shapes, and relative arrangements of components are not intended to limit the scope of the invention to the following embodiments.

Schematic Configuration of Image Forming Apparatus

Referring to FIG. 1, a schematic configuration of an image forming apparatus in an example of the present invention is described. FIG. 1 is a schematic cross-sectional view of an image forming apparatus 100 in the present example. The image forming apparatus 100 in the present example is a monochrome laser printer capable of forming a black monochrome image on a sheet-shaped recording material P by using an electrophotographic system.

An image forming portion 9 has a photosensitive drum 1 as a rotatable drum-shaped (cylindrical) photosensitive member (electrophotographic photosensitive member) serving as an image bearing member. Furthermore, the image forming portion 9 has, around the photosensitive drum 1, a charging roller 2 that is a roller-type charging member as a charging portion and a developing apparatus 8 as a developing unit. Furthermore, the image forming portion 9 has, around the photosensitive drum 1, a brush member 12 as a paper dust collection member and a static eliminating apparatus 11 as a static eliminating unit. Furthermore, the image forming portion 9 has a toner amount sensor 18 as a developer amount detection member. The charging roller 2, a developing roller 4 as a developer bearing member included in the developing apparatus 8, and the brush member 12 are disposed in contact with a surface (outer peripheral surface) of the photosensitive drum 1.

Furthermore, the image forming apparatus 100 has, as a part of the image forming portion 9, a transfer roller 13 that is a roller-type transfer member as a transfer portion, an exposure apparatus (exposure unit) 10 that is a laser scanner as an exposure portion, and a fixing apparatus 14 as a fixing unit. The transfer roller 13 is disposed in contact with the surface of the photosensitive drum 1.

Figure 2:
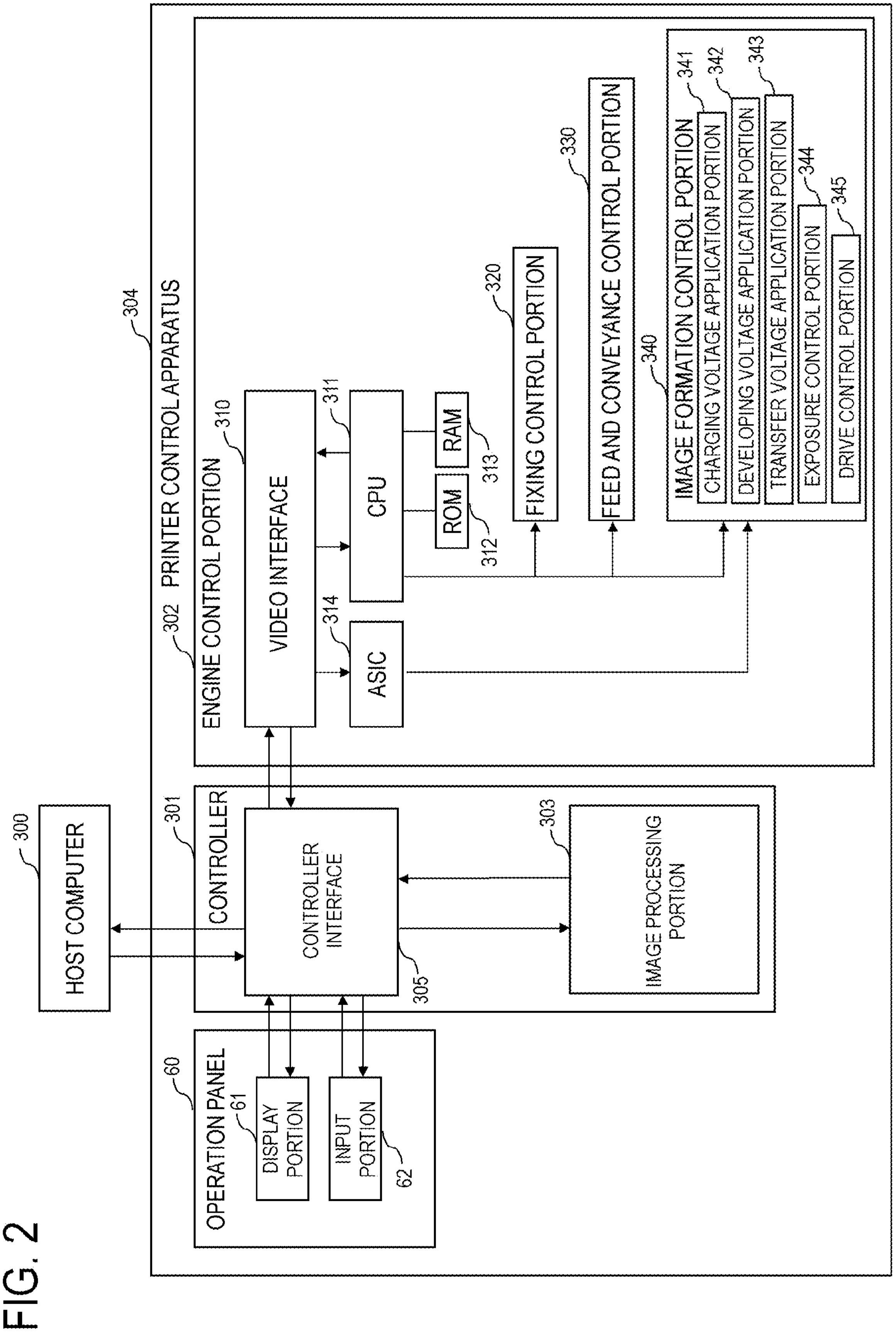
FIG. 2 is an explanatory diagram of a control configuration of the image forming apparatus according to the example of the present invention.

FIG. 2 is a block diagram illustrating a control form (printer system configuration) of the image forming apparatus 100 in the present example. The image forming apparatus 100 has a printer control apparatus 304 as a control portion (control unit). The printer control apparatus 304 uses a controller interface 305 described later such that the printer control apparatus 304 is connected to a host computer 300 as an external host device for the image forming apparatus 100 to perform communication therebetween.

The printer control apparatus 304 roughly has a controller portion 301 and an engine control portion 302. In the controller portion 301, the controller interface 305 and an image processing portion 303 are provided. In the engine control portion 302, a video interface 310, a CPU 311, a ROM 312, a RAM 313, an ASIC 314, a fixing control portion 320, a feed and conveyance control portion 330, and an image formation control portion 340 are provided. The image formation control portion 340 includes a charging voltage application portion 341, a developing voltage application portion 342, a transfer voltage application portion 343, an exposure control portion 344, and a drive control portion 345. The charging voltage application portion 341 includes a charging voltage application power source and a charging voltage application circuit as units for applying a charging voltage (charging bias) to the charging roller 2. The developing voltage application portion 342 includes a developing voltage application power source and a developing voltage application circuit as units for applying a developing voltage (developing bias) to the developing roller 4. The transfer voltage application portion 343 includes a transfer voltage application power source and a transfer voltage application circuit as units for applying a transfer voltage (transfer bias) to the transfer roller 13. The exposure control portion 344 controls exposure operation of an exposure apparatus 10. The drive control portion (drive portion) 345 controls driving of a drive motor 70 as a drive source and transmission of driving from the drive motor 70 to control driving of the photosensitive drum 1, the developing roller 4, a supply roller 5, and a stirring member 7.

In the controller portion 301, the image processing portion 303 receives print job information from the host computer 300 through the controller interface 305. The image processing portion 303 performs image processing on image data included in the print job information such that an image can be formed by the image forming portion 9. The image processing portion 303 determines a black image that is mainly constituted by a text or a line and a halftone image included in image data, and performs halftoning on the halftone image. The image processing portion 303 has a gradation table for halftoning corresponding to density of a halftone image, and performs halftoning such that the density of an image to be formed by the image forming portion 9 is adjusted to the density of a halftone image included in the image data. Then, the image processing portion 303 transmits image information that includes image data after image processing to the video interface 310 in the engine control portion 302.

The above-mentioned image information includes information for controlling turn-on timing of the exposure apparatus 10 as a laser scanner, information on print modes for controlling process conditions such as temperature adjustment and transfer bias, and information on image sizes. The information on turn-on timing of the exposure apparatus 10 is transmitted to the ASIC (Application Specific Integrated Circuit) 314. The ASIC 314 performs a part of control of the image forming portion 9 controlled by the image formation control portion 340, such as the exposure apparatus 10. On the other hand, the information on print modes and the information on image sizes described above are transmitted to the CPU (Central Processing Unit) 311.

The CPU 311 performs, for example, the following control. Specifically, the CPU 311 performs control of temperature of the fixing apparatus 14 in the fixing control portion 320 and control of operation (such as operation interval (feed interval)) of a feed portion 30 in the feed and conveyance control portion 330. Furthermore, the CPU 311 performs control in the image formation control portion 340, such as process speed, various kinds of voltages (such as developing voltage, charging voltage, and transfer voltage), and operation of a contact/separation mechanism (not shown) (contact or separation of the developing roller 4 with or from the photosensitive drum 1). Note that the CPU 311 performs the above-mentioned control by, as necessary, storing information in the RAM 313, using programs saved in the ROM 312 and the RAM 313, and referring to information saved in the ROM 312 and the RAM 313.

Furthermore, the controller portion 301 transmits a print command or a cancel instruction to the engine control portion 302 in accordance with an instruction performed by a user (operator) on the host computer 300, thereby controlling operations such as start or stop of print operation.

The operation panel 60 has a display portion for displaying information to an operator such as a user or a service representative by control of the printer control apparatus 304 and an input portion for inputting information to the printer control apparatus 304 in response to operation by the operator.

Image Forming Operation

Next, image forming operation in the image forming apparatus 100 in the present example is described.

A drive force is transmitted to the photosensitive drum 1 from a drive motor (not shown) as a drive source, and the photosensitive drum 1 is rotationally driven in a direction of the arrow R1 in FIG. 1 (counterclockwise direction) such that the surface of the photosensitive drum 1 has a predetermined peripheral velocity. The peripheral velocity of the photosensitive drum 1 in the present example is 140 mm/sec.

The charging roller 2 comes into contact with the surface of the photosensitive drum 1 with a predetermined contact pressure to form a charging portion. The charging roller 2 is applied with a predetermined charging voltage (charging bias) that is a direct voltage from a charging voltage application circuit in the charging voltage application portion 341 (FIG. 2) as a charging voltage application unit. In this manner, the charging roller 2 uniformly charges the surface of the photosensitive drum 1 to a predetermined potential having predetermined polarity (negative polarity in the present example). In the present example, the charging roller 2 is applied with a charging voltage of −1,400 V such that a surface potential (pre-exposure potential VD) of the photosensitive drum 1 becomes −800 V. Note that, in the present example, a direct voltage is used as the charging voltage, but the voltage is not limited thereto. As the charging voltage, an oscillation voltage obtained by superimposing a direct voltage and an alternating voltage may be used.

The uniformly charged surface of the photosensitive drum 1 is scanned and exposed by being applied with laser light on the basis of image information from the exposure apparatus 10 as a laser scanner, so that an electrostatic latent image (electrostatic image) is formed on the photosensitive drum 1. In the present example, the exposure apparatus 10 applies laser light to the surface of the photosensitive drum 1 at 0.35 $\mu J/cm^2$, which is a predetermined exposure amount.

The electrostatic latent image formed on the photosensitive drum 1 is supplied with toner as developer from the developing apparatus 8, and developed (visualized), so that a toner image (developer image) is formed on the photosensitive drum 1. The developing apparatus 8 has the developing roller 4 as a developer bearing member. The developing roller 4 comes into contact with the surface of the photosensitive drum 1 with a predetermined contact pressure to form a developing portion. On the developing roller 4, a toner layer is formed by toner 3 charged to predetermined polarity (in the present example, negative polarity). The developing roller 4 is applied with a predetermined developing voltage (developing bias) that is a direct voltage from a developing voltage application circuit in the developing voltage application portion 342 (FIG. 2) as a developing voltage application unit. In this manner, the toner 3 is attached to the electrostatic latent image on the photosensitive drum 1 at the developing portion. In this manner, a toner image (developer image) is formed on the photosensitive drum 1. In the present example, the developing roller 4 is applied with a developing voltage of −400 V.

In the present example, toner 3 that has been charged to the same polarity (negative polarity in the present example) as the charging polarity of the photosensitive drum 1 is attached to an exposure area (image portion) on the photosensitive drum 1 in which the absolute value of potential has decreased because the photosensitive drum 1 is exposed after being uniformly charged (reversal development type). In the present example, regular charging polarity of the toner 3, which is primary charging polarity of the toner 3 during development, is negative polarity.

The transfer roller 13 comes into contact with the photosensitive drum 1 with a predetermined contact pressure to form a transfer portion. The toner image formed on the photosensitive drum 1 is transferred onto a recording material P that has been conveyed while being sandwiched by the photosensitive drum 1 and the transfer roller 13 at the transfer portion. During the transfer, the transfer roller 13 is applied with a predetermined transfer voltage (transfer bias) that is a direct voltage from a transfer voltage application circuit in the transfer voltage application portion 343 (FIG. 2) as a transfer voltage application unit. In the present example, the transfer roller 13 is applied with a transfer voltage of +1,500 V.

The recording material (transfer material, recording medium, sheet) P is supplied to the transfer portion from the feed portion 30 provided at a lower part of the apparatus main body M. The feed portion 30 has a cassette 31 as a recording material containing portion and a feed roller 32 as a feed member. The recording materials P contained in the cassette 31 are fed from the cassette 31 by the feed roller 32 while being separated one by one. The recording material P is conveyed by a conveyance roller (registration roller) 50 as a conveyance member to the transfer portion in synchronization with the toner image on the photosensitive drum 1.

The recording material P having the toner image transferred thereon is conveyed to the fixing apparatus 14 as the fixing unit. The fixing apparatus 14 applies heat and pressure to the recording material P, thereby fixing (melting, fixing) the toner image on the recording material P. The recording material P having the toner image fixed thereon is discharged (output) onto a tray 40 as a discharge portion provided outside the image forming apparatus 100.

Collection of Cleaner-Less Toner

On the other hand, toner (transfer residual toner) that has not been transferred on the recording material P in the transfer process but remains on the photosensitive drum 1 is removed from the photosensitive drum 1 in the following manner.

The static of the surface of the photosensitive drum 1 after the transfer process is removed by the static eliminating apparatus (static eliminating lamp) 11 such that the surface potential becomes 0 V, and then the surface of the photosensitive drum 1 enters the charging portion. In the transfer residual toner that remains on the photosensitive drum 1, toner charged to positive polarity and toner that is charged to negative polarity but does not have sufficient charges are mixed. These kinds of transfer residual toner are charged to negative polarity by discharge at the charging portion.

The transfer residual toner that has been charged to negative polarity at the charging portion reaches the developing portion along with the rotation of the photosensitive drum 1. In this case, an electrostatic latent image corresponding to image information is formed on the surface of the photosensitive drum 1 that has reached the developing portion. Transfer residual toner attached to a non-exposure area (non-image portion) on the photosensitive drum 1 moves from the photosensitive drum 1 to the developing roller 4 due to a potential difference between the pre-exposure potential VD on the photosensitive drum 1 and the developing voltage at the developing portion, and is collected to the developing chamber **8*b* in the developing apparatus 8. Note that the toner collected in the developing chamber 8*b*** is used for image formation again.

On the other hand, transfer residual toner attached to an exposure area (image portion) on the photosensitive drum 1 does not move from the photosensitive drum 1 to the developing roller 4 at the developing portion, but constitutes a toner image together with toner that has moved from the developing roller 4 to the photosensitive drum 1. Then, this toner is transferred onto the recording material P at the transfer portion, and removed from the photosensitive drum 1.

Collection of Paper Dust

The brush member 12 is provided, which is a paper dust collection member for removing paper dust fibers that have been generated from the recording material P and attached to the photosensitive drum 1 from the recording material P in the transfer process. The brush member 12 is disposed in contact with the photosensitive drum 1 on the downstream side of the transfer portion and on the upstream side of the charging portion in the rotation direction of the photosensitive drum 1. The brush member 12 rubs the surface of the photosensitive drum 1 along with the rotation of the photosensitive drum 1, thereby catching the paper dust fibers on the photosensitive drum 1 and removing the paper dust fibers from the photosensitive drum 1.

Detailed Configuration of Developing Apparatus 8

A detailed configuration of the developing apparatus 8 in the image forming apparatus 100 in the present example is described.

In the present example, the developing apparatus 8 is a single component contact developing apparatus that uses non-magnetic single component developer (toner) as developer. The developing apparatus 8 has a developer container (frame body) 80 including a toner containing chamber *8a* as a developer containing chamber and a developing chamber *8b* in which the developing roller 4 as a developer bearing member is disposed. The developing chamber *8b* and the toner containing chamber *8a* communicate with each other. In the developing chamber *8b*, in addition to the developing roller 4, the supply roller 5 as a supply member for supplying toner 3 to the developing roller 4 and the developing blade 6 as a regulating member are provided. The developing blade 6 is configured to regulate the amount of toner on the developing roller 4 while applying the toner 3 on the developing roller 4 with charges having predetermined polarity.

The developing roller 4 is disposed in an opening portion of the developing chamber *8b* (developer container 80) so as to be rotatable. A part of the peripheral surface of the developing roller 4 is exposed to the outside of the developer container 80 through the opening portion, and is opposed to the photosensitive drum 1 in a region exposed to the outside of the developer container 80. By rotating while bearing the toner 3, the developing roller 4 conveys the toner 3 from the inside of the developing chamber *8b* (developer container 80) to the outside. In the toner containing chamber *8a*, the toner 3 as developer is contained. Furthermore, the toner containing chamber *8a* is provided with the stirring member 7 configured to convey the toner 3 from the toner containing chamber *8a* to the developing chamber *8b* while stirring the toner 3 in the toner containing chamber *8a*.

In the present example, the developing roller 4 is configured by coating the outer periphery of a cored bar having a diameter of 6 mm with a base layer of silicone rubber and a surface layer of urethane rubber in this order so as to have an outer diameter of 15 mm. In the present example, the developing roller 4 has an electric resistance value of $1\times10^4$ to $1\times10^{12}\Omega$.

Furthermore, in the present example, the supply roller 5 is a conductive elastic sponge roller configured by forming a foamed layer on the outer periphery of a cored bar having a diameter of 6 mm. In the present example, the supply roller 5 has an electric resistance value of $1\times10^4$ to $1\times10^8\Omega$ and a hardness of 200 gf. The hardness of the supply roller 5 is a value obtained by measuring a load when a plate having a longitudinal width of 50 mm is caused to enter the surface of the supply roller 5 by 1 mm.

In the present example, the developing blade 6 is a SUS plate made of metal with a thickness of 0.1 mm and predetermined lengths in a longitudinal direction along a rotation axis direction of the developing roller 4 and in a lateral direction substantially orthogonal to the longitudinal direction. The developing blade 6 is disposed in contact with the developing roller 4 such that a free end thereof in the lateral direction is directed to the upstream side in the rotation direction of the developing roller 4 and the side surface near the free end is along the longitudinal direction. In the present example, as the developing blade 6, a blade obtained by cutting a distal end (free end) of a SUS plate from a contact surface side of the developing roller 4 was used. The distal end portion of the developing blade 6 is curved in the cutting direction by cutting, and the curve amount of the distal end of the developing blade 6 corresponding to the curvature radius R is 0.02 mm.

Motion of the toner 3 in the developing apparatus 8 during driving is described. A drive force is transmitted to the developing apparatus 8 from the drive motor 70 that is a drive source provided to the apparatus main body M and constituting a drive unit. In this manner, the developing roller 4, the supply roller 5, and the stirring member 7 rotate in a direction of the arrow R2 (clockwise direction) in the drawing, a direction of the arrow R3 (clockwise direction), and a direction of the arrow R4 (counterclockwise direction).

In this case, when a ratio of the peripheral velocity of the surface of the developing roller 4 to the peripheral velocity of the surface of the photosensitive drum 1 is defined as a developing peripheral velocity ratio, the surface of the developing roller 4 is rotationally driven at a predetermined peripheral velocity such that the developing peripheral velocity ratio is 1.4.

When the stirring member 7 in the toner containing chamber *8a* rotates, toner 3 in the toner containing chamber *8a* is stirred and conveyed toward the supply roller 5 in the developing chamber *8b*. The toner 3 held by a foamed layer of the supply roller 5 is sent to a contact portion with the developing roller 4 along with the rotation of the supply roller 5. Then, the toner 3 that has reached the contact portion is rubbed by the surface of the developing roller 4 and the surface of the supply roller 5 that move in opposite directions at the contact portion, and a part of the toner is attached to the surface of the developing roller 4. Note that the supply roller 5 may be rotated in the same rotation direction as that of the developing roller 4, and the movement directions of the supply roller 5 and the developing roller 4 at the contact portion may be forward directions.

The toner 3 attached to the surface of the developing roller 4 is sent to the contact portion with the developing blade 6 along with the rotation of the developing roller 4. The developing blade 6 regulates the amount of the toner 3 attached to the surface of the developing roller 4 to form a uniform thin layer, and triboelectrically charges the toner 3. The thinned toner 3 is sent to the contact portion with the photosensitive drum 1 along with the rotation of the developing roller 4, and is used to develop an electrostatic latent image formed on the photosensitive drum 1.

The toner 3 that has not been used for development but remains on the surface of the developing roller 4 is conveyed to the contact portion with the supply roller 5 and is removed from the surface of the developing roller 4 by the supply roller 5. The removed toner 3 is sent into the toner containing chamber 8*a*, and is stirred and mixed with the toner 3 in the toner containing chamber 8*a*.

Toner Replenishment Configuration

Figure 3B:
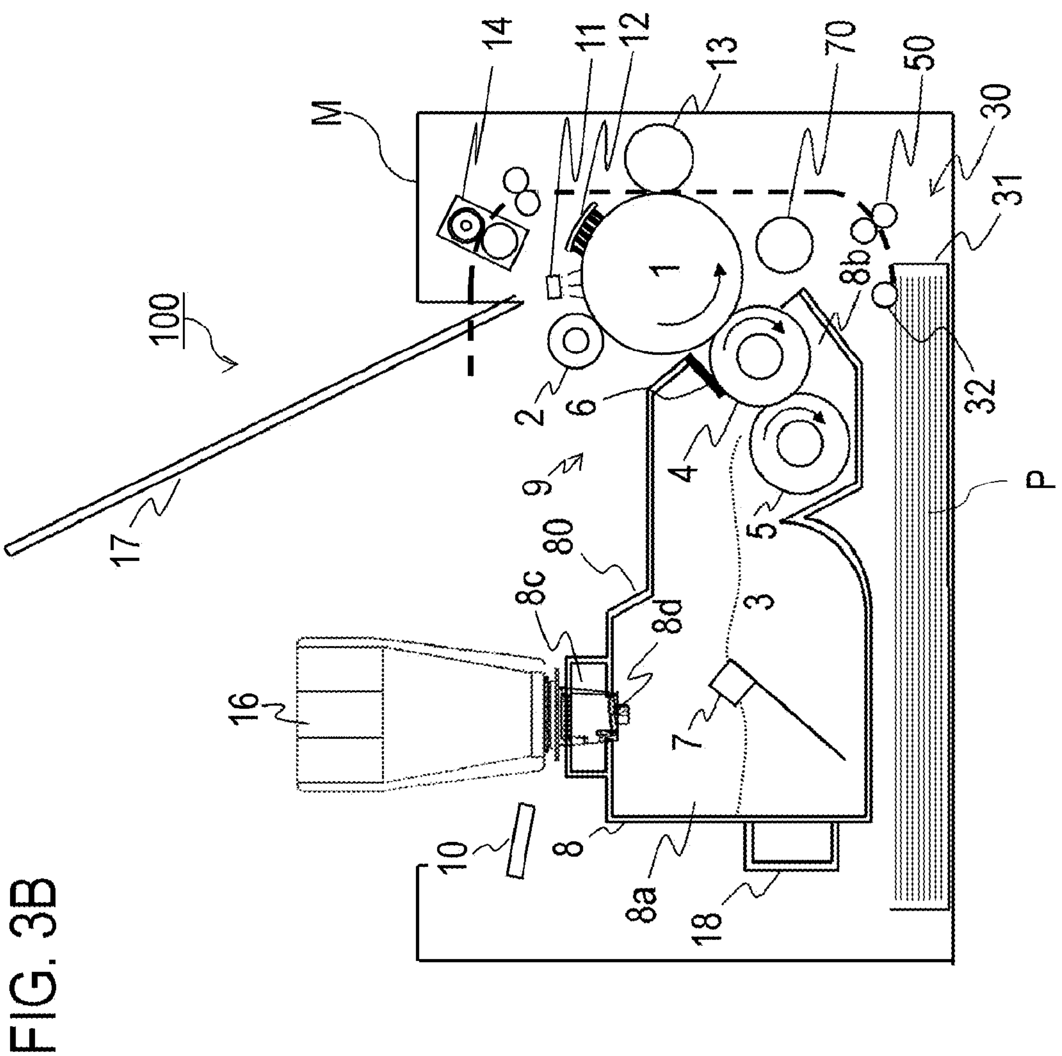
FIGS. 3A and 3B are a schematic front view of a toner pack and a schematic cross-sectional view of the image forming apparatus in a state in which the toner pack is mounted.
Figure 3A:
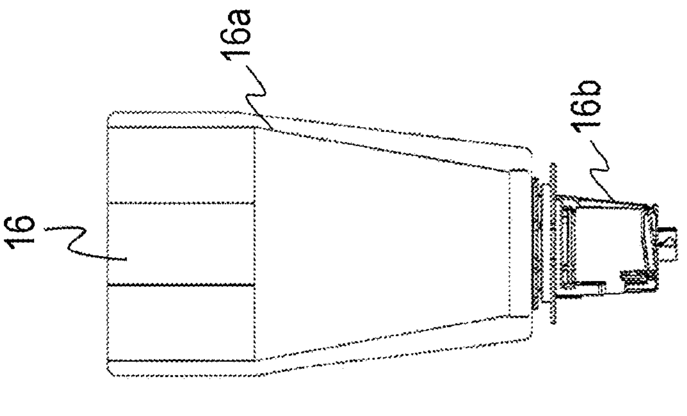

A toner replenishment configuration of the developer container 80 in the developing apparatus 8 in the present example is described. FIG. 3A is a schematic front view of a toner pack 16 as a toner replenishment container in the present example. FIG. 3B is a schematic cross-sectional view illustrating a state in which the toner pack 16 is mounted to the developer container 80 in the developing apparatus 8.

As illustrated in FIG. 1 and FIG. 3B, a replenishment protruding portion 8*c* is formed at the developer container 80. The replenishment protruding portion 8*c* has a hollow inside, and is formed so as to communicate with the toner containing chamber 8*a* through a replenishment port 8*d*. At an upper part of the apparatus main body M, a top cover 17 is provided to be openable and closable. Note that the top surface of the top cover 17 constitutes the above-mentioned tray 40.

As illustrated in FIG. 3A, in the present example, the toner pack 16 has an easily-deformable plastic wrapper 16*a* and a coupling portion 16*b* provided at one end of the wrapper 16*a*. The inside of the wrapper 16*a* and the inside of the coupling portion 16*b* communicate with each other. As illustrated in FIG. 3B, the image forming apparatus 100 is configured such that when the top cover 17 is opened so that a space above the replenishment protruding portion 8*c* is opened (in a direction to retreat from above the replenishment protruding portion 8*c*), the replenishment protruding portion 8*c* is exposed to the outside of the apparatus. At an end of the replenishment protruding portion 8*c*, the toner pack 16 (the coupling portion 16*b* thereof) can be mounted. When the toner pack 16 is mounted to the replenishment protruding portion 8*c*, the toner containing chamber 8*a* can be replenished with toner from the toner pack 16. The toner pack 16 is coupled to the replenishment protruding portion 8*c* through the coupling portion 16*b* in the state in which the top cover 17 is opened, so that the toner pack 16 is mounted to the replenishment protruding portion 8*c* in a state in which at least a part of the wrapper 16*a* on one end on the side opposite to the coupling portion 16*b* is exposed to the outside of the image forming apparatus 100.

More specifically, when the toner pack 16 is mounted to the replenishment protruding portion 8*c*, the inside of the toner pack 16 (wrapper 16*a*, coupling portion 16*b*) and the inside of the replenishment protruding portion 8*c* communicate with each other. Then, toner contained in the toner pack 16 is discharged to the inside of the replenishment protruding portion 8*c* through an opening (not shown) provided in the coupling portion 16*b* of the toner pack 16, and the toner is replenished into the toner containing chamber 8*a* from the replenishment protruding portion 8*c* through the replenishment port 8*d*.

Note that, in the present example, the toner pack 16 as a toner replenishment container has an easily-deformable plastic wrapper, but the configuration is not limited thereto. For example, the toner replenishment container may have a bottle container having a substantially conical shape or a substantially cylindrical shape. Furthermore, for example, the toner replenishment container may have a paper container made of paper.

As the method for discharging toner from the toner replenishment container, it is preferred that an operator squeeze the container when the container is the toner pack 16 as in the present example or a paper container, and it is preferred that an operator tap and vibrate the container when the container is a bottle container. To discharge toner from a bottle container, the bottle container may be provided with a discharge mechanism. The discharge mechanism may be engaged with a drive mechanism provided to the image forming apparatus 100 so as to receive driving from the drive mechanism.

In order to prevent leakage of toner from the toner replenishment container, the toner replenishment container may be provided with a rotation type or slide type shutter member. Furthermore, the shutter member may be configured so as to be broken when being mounted to the replenishment port of the developing apparatus 8, or may have a removable lid structure such as a seal.

The top cover 17 only needs to be configured such that at least a space above the replenishment protruding portion 8*c* (replenishment port 8*d*) can be opened. For example, the top cover 17 is not necessarily required to serve as the tray 40, or the top cover 17 may constitute a part of the tray 40.

Toner Replenishment Instruction

When image forming operation is repeated, toner contained in the toner containing chamber 8*a* is consumed. When the remaining amount of toner in the developer container 80 decreases the toner amount detected by the toner amount sensor 18 becomes smaller than a toner Low threshold set in advance, the engine control portion 302 displays a toner Low indication on the display portion 61 of the operation panel 60. The toner Low indication is an indication that the remaining amount of toner in the developer container 80 is small. When the image forming operation is further repeated from a timing of the detection of toner Low and the toner amount detected by the toner amount sensor 18 becomes smaller than a toner Out threshold set in advance, the engine control portion 302 displays a toner Out indication on the display portion 61 of the operation panel 60. The toner Out indication is an indication that toner in the developer container 80 is empty. Furthermore, the engine control portion 302 displays an indication that prompts implementation of toner replenishment together with the toner Out indication.

Figure 6A:
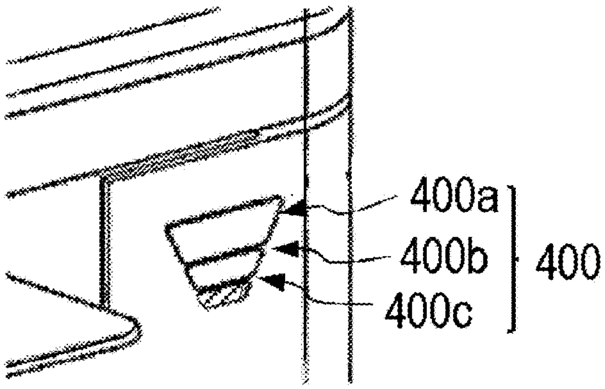
FIGS. 6A to 6C are diagrams of a configuration example of a toner remaining amount panel.
Figure 6B:
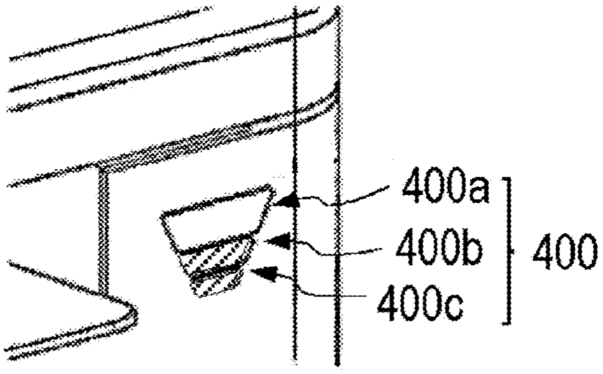
Figure 6C:
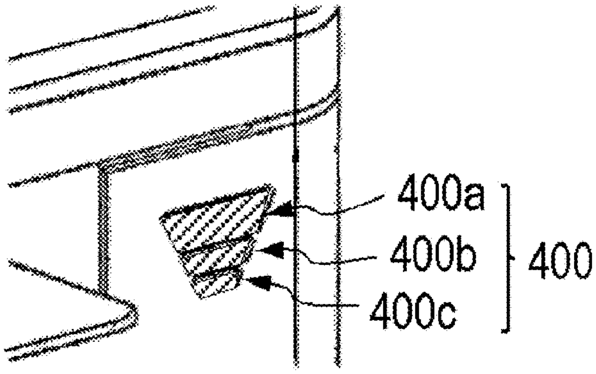

As a display configuration of the toner remaining amount, a configuration as illustrated in FIGS. 6A to 6C may be employed. As illustrated in FIGS. 6A to 6C, the display configuration is provided to a part of a casing of the apparatus main body M of the image forming apparatus 100. FIG. 6A is a perspective view illustrating a toner remaining amount panel 400 in which the remaining amount of toner indicates Low level. FIG. 6B is a perspective view of the toner remaining amount panel 400 in which the remaining amount of toner indicates Mid level. FIG. 6C is a perspective view of the toner remaining amount panel 400 in which the remaining amount of toner indicates Full level. The toner remaining amount panel 400 is a panel member including marks 400*a* to 400*c* as a plurality of (three in this case) indicators arranged side by side in an up-down direction. When the toner remaining amount indicates Low level, only the mark 400*a* is turned on as illustrated in FIG. 6A. When the toner remaining amount indicates Mid level, the mark 400*a* and the mark 400*b* are turned on as illustrated in FIG. 6B. When the toner remaining amount indicates Full level, all the marks 400*a* to 400*c* are turned on.

Problems

In a case where image forming operation with a low image coverage is repeated, the amount of toner in the developer container 80 reaches a toner Out threshold, and before toner is replenished, image failure such as fogging may occur. The image forming operation with a low image coverage refers to image forming operation in which a ratio of a printing area (area where toner is placed in image formable region) to a sheet area (area of image formable region of recording material) (hereinafter referred to as "image coverage") is small and the amount of toner consumption is small. Typical examples of the image formation with a low image coverage include image formation in which images include only texts or lines so that the image coverage is low.

Note that, in the case where the same image coverage is provided between a recording material with a small size and a recording material with a large size, a printing area in the small-sized recording material is relatively smaller than in the large-sized recording material, and hence the above-mentioned image failure such as fogging more easily occurs. In the present example, control of image forming operation based on an image coverage for a recording material with an LTR size as a small-sized recording material is described. An image coverage of 100% in the present example corresponds to the amount of printing when a solid black image is formed in the entire image formable region on a single LTR-size recording material.

One of causes of image failure such as fogging is toner deterioration, and one of causes of the toner deterioration is flowing and stirring of toner in a developer container during image forming operation. Toner in the developer container 80 is repeatedly rubbed by the supply roller 5 and the developing blade 6 during image forming operation, and releasing and embedding of an external additive to a toner base or deformation of the toner base itself occur and the toner deteriorates. Toner used for development during image forming operation is a part of the toner in the developer container, and most of the toner is not used for development but remains in the developer container 80. Such residual of toner becomes more conspicuous when image forming operation with a low image coverage continues. As the image coverage of image formation becomes lower, a larger amount of toner in the developer container 80 is not consumed but remains in the developer container 80, a large number of image forming operations are repeated before toner replenishment in the developer container 80 is performed. Toner deterioration progresses when toner continues to remain in the developer container without being used for development each time image forming operation is performed. Thus, as image formation has a lower image coverage, toner deterioration in the developer container 80 is more accelerated before the amount of toner in the developer container is consumed to a predetermined amount with which a user is prompted for toner replenishment, and image failure such as fogging easily occurs before toner replenishment is performed.

Features

In view of the above, in the present example, a low-image coverage support mode is provided in order to prevent occurrence of image failure such as fogging before the amount of toner in the developer container 80 reaches a toner Out threshold and toner replenishment is performed even when image forming operation with a low image coverage is repeated. Specifically, the image forming apparatus 100 in the present example is capable of executing a normal mode (first operation mode) that supports the normal image forming operation described above and a low-image coverage support mode (second operation mode) that supports image forming operation with a low image coverage as options.

The low-image coverage support mode can be selected by the input portion 62 in the operation panel 60. When a user selects the low-image coverage support mode by the input portion 62 in the operation panel 60, the fact that the low-image coverage support mode has been selected is transmitted to the engine control portion 302, and the fact that the low-image coverage support mode has been selected is stored in the engine control portion 302.

Then, when the low-image coverage support mode is selected, the engine control portion 302 changes the normal mode corresponding to the normal image forming operation as follows.

First, when the low-image coverage support mode is selected, the peripheral velocity of the photosensitive drum 1 (movement velocity of peripheral surface of photosensitive drum 1) is set to be ⅔ times as large as the normal image forming operation. Furthermore, when the low-image coverage support mode is selected, by setting the peripheral velocity of the developing roller 4 to be ⅔ times as large as the normal image forming operation, the developing peripheral velocity ratio is set to 1.4 similarly to the normal image forming operation.

The configuration in which the peripheral velocities of the photosensitive drum 1 and the developing roller 4 are variable can be implemented by, for example, independently providing a drive configuration of the photosensitive drum 1 and a drive configuration of the developing roller 4 and independently controlling the photosensitive drum 1 and the developing roller 4 by the engine control portion 302 (image formation control portion 340). In other words, the photosensitive drum 1 and the developing roller 4 are driven by different drive motors (drive sources). Note that, in the case where the developing peripheral velocity ratio is maintained constant between the normal mode and the low-image coverage support mode as in the present example, the photosensitive drum and the developing roller may be driven by the same drive motor (common drive source).

Furthermore, when the low-image coverage support mode is selected, the exposure intensity of laser light from the exposure apparatus 10 to the surface of the photosensitive drum 1 is set to be 1.2 times as large as the normal image forming operation. Examples of the method for increasing the exposure intensity include a method for increasing output of laser light (light amount per unit area of the surface of the photosensitive drum 1) of the exposure apparatus 10. Specifically, in the normal mode, as described above, the output (light amount) of laser light of the exposure apparatus 10 is set to 0.35 $\mu J/cm^2$ (first exposure intensity) that is a predetermined exposure amount (first exposure amount). In the low-image coverage support mode, on the other hand, the output of laser light of the exposure apparatus 10 is increased to 0.42 $\mu J/cm^2$ (second exposure intensity) that is a second exposure amount.

Other controls performed when the low-image coverage support mode is selected are the same as in the normal image forming operation, and hence descriptions thereof are omitted.

EFFECTS

Next, effects of the low-image coverage support mode in the present example are described.

In the low-image coverage support mode, the peripheral velocity of the photosensitive drum 1 is decreased as compared to the normal image forming operation, and hence a time period during which the photosensitive drum 1 is exposed by the exposure apparatus 10 increases, and the exposure amount per unit area of the photosensitive drum 1 can be increased to increase the exposure amount of the surface of the photosensitive drum 1. Furthermore, in the low-image coverage support mode, the exposure intensity of the exposure apparatus 10 for the surface of the photosensitive drum 1 is increased as compared to the normal image forming operation, and hence the exposure amount of the surface of the photosensitive drum 1 in this image forming operation can be increased as compared to the normal image forming operation. Then, in this manner, in the low-image coverage support mode, the exposure amount of the surface of the photosensitive drum 1 is larger than that in the normal image forming operation, and hence a latent image that is deeper than that in the normal image forming operation can be formed on the surface of the photosensitive drum 1. A deep latent image refers to an electrostatic latent image that has a large potential difference on the peripheral surface of the photosensitive drum 1 between an image portion potential that is formed by exposure of the exposure apparatus 10 and a non-image portion potential that is not exposed by the exposure apparatus 10 or formed by extremely slight exposure. Thus, the amount of development of toner from the developing roller 4 to a latent image on the surface of the photosensitive drum 1 increases, and the amount of consumption of toner in the developer container 80 in image forming operation can be increased.

Furthermore, in the low-image coverage support mode, in addition to decreasing the peripheral velocity of the photosensitive drum 1 as compared to the normal image forming operation, the peripheral velocity of the developing roller 4 was also decreased such that the developing peripheral velocity ratio was 1.4 similarly to the normal image forming operation. On the other hand, if the developing peripheral velocity ratio is not maintained constant and the developing peripheral velocity ratio in the low-image coverage support mode is set to be larger than in the normal image forming operation, the developing roller 4 is rotated faster than the photosensitive drum 1, and the opportunity of rubbing of toner on the developing roller 4 increases. According to the present example, such opportunity of rubbing of toner can be prevented from increasing, and the acceleration of toner deterioration due to the increase of the opportunity of rubbing of toner can be prevented. Note that, from the viewpoint of toner deterioration, it is preferred that the developing peripheral velocity ratio be maintained or set to be small, but depending on conditions, the developing peripheral velocity ratio may be controlled to be large in consideration of toner deterioration.

Confirmation of Effects

To confirm the effects of the low-image coverage support mode in the present example, a test described below was conducted.

In the test, in the image forming apparatus in the present example, in the state in which the low-image coverage support mode was designated, operation of printing text images with an image coverage of 1.5% two by two on LTR-size sheets was repeated under normal environments of 23° C. and 50% until toner Out was displayed. The sheets used were "Vitality 75 (manufactured by Xerox Corporation)". In the developer container 80 before the test, toner with an amount with which toner Out is displayed when about 5,000 images at an image coverage of 4.0% are printed on LTR-size sheets was loaded.

As a comparative example, in an image forming apparatus having the same configuration as that of the image forming apparatus in the present example, the same test as in the present example was performed in a state in which the low-image coverage support mode was not designated.

First, in the image forming apparatus in the present example, the low-image coverage support mode is designated, and hence the amount of consumption of toner per image forming operation increases as compared to the case where a normal mode is designated. Thus, in the image forming apparatus in the present example, toner Out was displayed at a timing of about 11,000 prints from the start of the test, and image failure such as fogging did not occur until toner Out was displayed.

Furthermore, by setting the rotation of the photosensitive drum to be low and increasing the exposure amount, an electrostatic latent image in which a gradient of a boundary between the image portion potential and the non-image portion potential is sharper can be formed. In this manner, particularly in a text image, an image having a clear boundary between an image portion and a non-image portion can be formed, and image quality can be improved.

In the image forming apparatus in the comparative example, on the other hand, the low-image coverage support mode is not designated, and hence the amount of consumption of toner per image forming operation is smaller than that in the image forming apparatus in the present example in which the low-image coverage support mode is designated. Thus, in the image forming apparatus in the comparative example, image failure due to fogging occurred at a timing of about 13,000 prints from the start of the test, and toner Out was displayed at a timing of about 14,000 prints thereafter.

As described above, in the low-image coverage support mode in the present example, even when image forming operation with a low image coverage is repeated, the amount of toner in the developer container 80 can be prevented from reaching a toner Out threshold such that image failure such as fogging can be prevented from occurring before toner is replenished.

Furthermore, in the present example, the low-image coverage support mode is selected by the input portion 62 in the operation panel 60 provided to the image forming apparatus, but the method for selecting the low-image coverage support mode is not limited to the selection by using the input portion 62 in the operation panel 60. For example, the low-image coverage support mode may be selected by an information device such as a personal computer, a smartphone, and a tablet terminal as a host computer connected to the image forming apparatus.

Furthermore, in the present example, the configuration in which an operator selects the low-image coverage support mode has been described, but the image forming apparatus may automatically selects the low-image coverage support mode depending on the image coverage of an image to be formed. Alternatively, the image forming apparatus may automatically select the low-image coverage support mode depending on consumption pace of toner in the developer container 80 detected by the toner amount sensor 18.

In the automatic switching of an operation mode depending on the image coverage, the image coverage may be detected by the following method. Specifically, a measurement unit (pixel count) capable of counting the number of pixels that are caused to emit light by the exposure apparatus 10 may be used to acquire an image coverage on the basis of the number of pixels with respect to a printing area (amount of toner consumed in printing of one recording material). The measurement unit may be configured by the engine control portion 302, or may be provided separately from the engine control portion 302. The pixel count refers to counting individual image signals that form image dots of an image to be formed from image data after image processing included in image information transmitted from the image processing portion 303 to the engine control portion 302. In regard to a toner amount required for developing an image, the engine control portion 302 (image formation control portion 340) a toner consumption amount x [%] used by printing of one recording material from the number of pixels caused to emit light by the exposure apparatus 10.

Furthermore, a threshold for the image coverage (predetermined image coverage) in the automatic switching of an operation mode depending on the image coverage may be 1.5 to 2.0%. In other words, when the detected image coverage is equal to or lower than a predetermined image coverage, the low-image coverage support mode may be selected and executed.

Example 2

In an image forming apparatus in Example 2 of the present invention, when a low-image coverage support mode is selected, the developing roller 4 is rotationally driven at such a peripheral velocity that the developing peripheral velocity ratio is 1.3. The other configurations are the same as those in Example 1, and hence descriptions thereof are omitted.

In the configuration in the present example, the developing peripheral velocity ratio (1.3) when the low-image coverage support mode is selected is smaller than the developing peripheral velocity ratio (1.4) in the normal image forming operation, and hence the opportunity to rub the toner on the developing roller 4 can be reduced to prevent toner deterioration.

In the present example, the developing peripheral velocity ratio when the low-image coverage support mode is selected is 1.3, but if the developing peripheral velocity ratio is too small, the toner consumption amount cannot be increase in some cases even by forming a deeper electrostatic latent image on the surface of the photosensitive drum 1 than in the normal image forming operation when the low-image coverage support mode is selected. In other words, if the developing peripheral velocity ratio is too small, toner deterioration may be accelerated in contrast, and hence it is preferred that the reduction width of the developing peripheral velocity ratio be set depending on characteristics of the image forming apparatus.

Example 3

In an image forming apparatus in Example 3 of the present invention, a gradation table for halftoning (gradation correction) used by the image processing portion 303 is changed between when the low-image coverage support mode is selected and when the low-image coverage support mode is not selected. A gradation table used when the low-image coverage support mode is selected is a table whose gradation on a side where density is lower than in a gradation table used when the low-image coverage support mode is not selected in halftoning of halftone image data with the same density is selected. The other configurations are the same as those in Example 1, and hence descriptions thereof are omitted.

Figure 4:
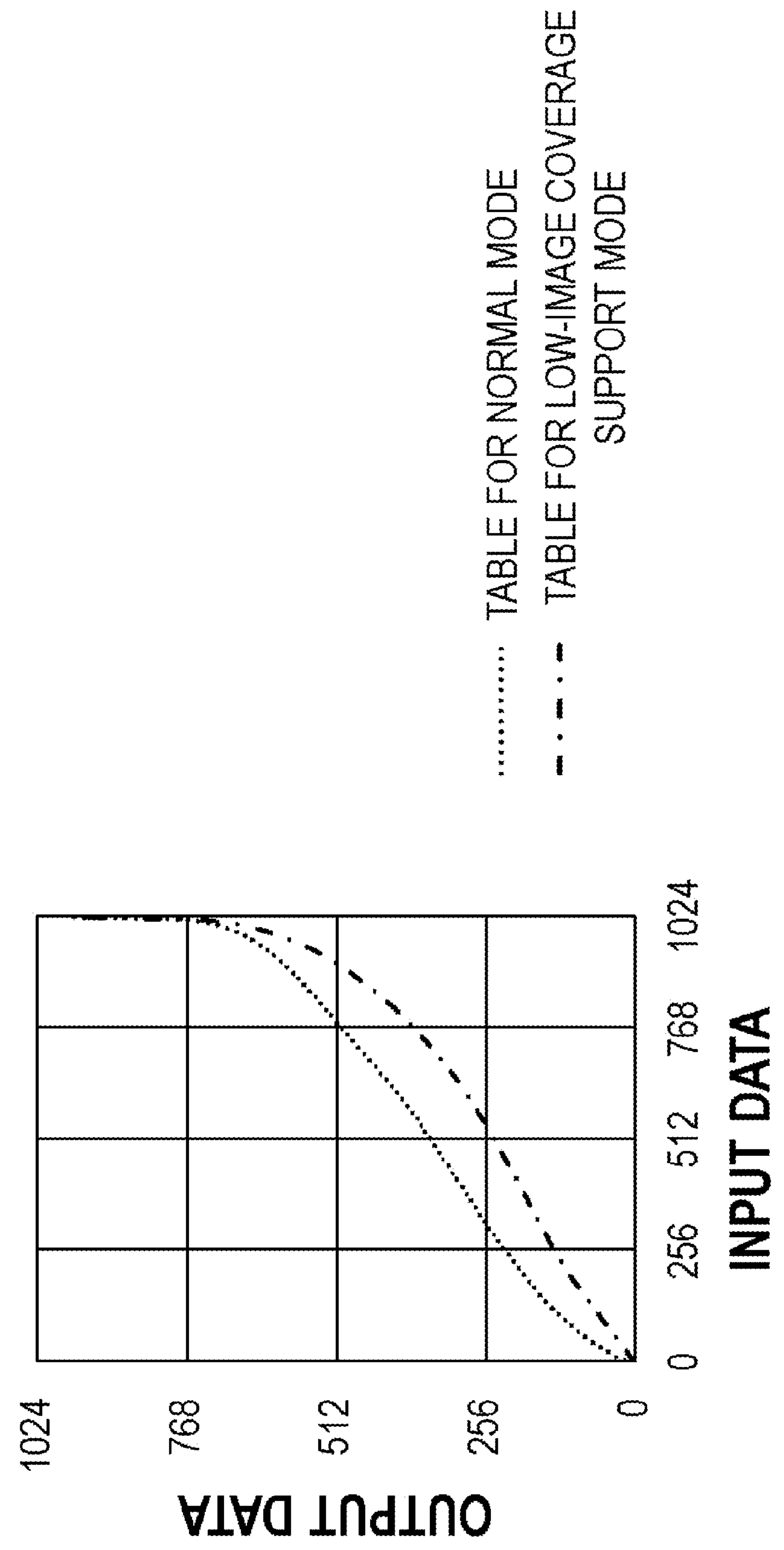
FIG. 4 is an explanatory diagram of a gradation table.

As illustrated in FIG. 4, in the normal mode, a table for normal mode (first gradation table) exhibiting a gradation curve indicated by the broken line in FIG. 4 is used, and in the low-image coverage support mode, a table for low-image coverage support mode (second gradation table) exhibiting a gradation curve indicated by the dash-dotted line in FIG. 4 is used. In the two gradation tables, densities of output data for the same input data are different. Specifically, in regard to a value (density) of output data corresponding to certain input data, the value of output data when the table for low-image coverage support mode is used is smaller (lighter) than the value of output data when the table for normal mode is used.

If the same gradation table as that in the normal image forming operation is used such that, when the low-image coverage support mode is selected, an electrostatic latent image on the surface of the photosensitive drum 1 is formed deeper than in the normal image forming operation (such that potential difference between image portion and non-image portion is larger), a halftone image portion may be formed with density higher than in the normal image forming operation. As in the present example, by using a different gradation table depending on the operation mode, the density of an image formed can be prevented from being too high.

As a gradation table used when the low-image coverage support mode is selected, halftone gradation that is lower than in a gradation table used when the low-image coverage support mode is not selected is preferably determined depending on characteristics of the image forming apparatus itself. In the present example, the case where only one gradation table for low-image coverage support mode is provided has been exemplified, but a plurality of gradation tables with steps may be provided. For example, a gradation table to be used may be switched among a plurality of gradation tables for low-image coverage support mode such that the density is gradually decreased depending on the magnitude of the image coverage.

Example 4

In an image forming apparatus in Example 4 of the present invention, when the low-image coverage support mode is selected, image processing (expansion processing) is performed by the image processing portion 303 such that the periphery of an image portion that has been determined to be a text or a line in image data is exposed by the exposure apparatus 10. Other configurations are the same as those in Example 1, and hence descriptions thereof are omitted.

The image data includes information on attributes of objects constituting an image, such as a text (character), a line, a graphic, and a photo, the number of pixels, a gradation value of each pixel, and coordinates in the image.

Figure 5A:
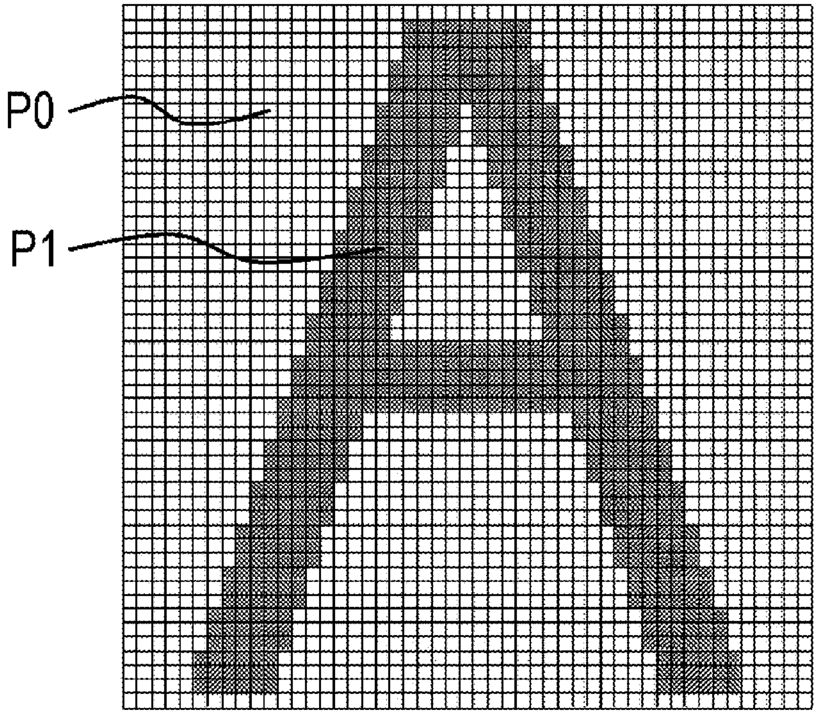
FIGS. 5A and 5B are explanatory diagrams of expansion processing.

FIG. 5A is a schematic diagram illustrating pixel data constituting a character "A" as an example of an object whose attribute is text. As illustrated in FIG. 5A, for example, when a character "A" is included in image data, a region in which the character "A" is formed in the image includes image portion pixels P1 constituting the character "A" and non-image portion pixels P0 constituting the background of the character "A". The image portion pixel P1 is typically a black image portion in which black dots are formed, and is, for example, a pixel whose gradation value is 255 and which is applied with laser light during exposure such that toner is attached thereto. The non-image portion pixel P0 is typically a white image portion in which white dots or dots in a light color near white are formed, and is a pixel whose gradation value is 0 or approximately 0 and which is not applied with laser light during exposure or which is slightly applied with laser light with low output.

Figure 5B:
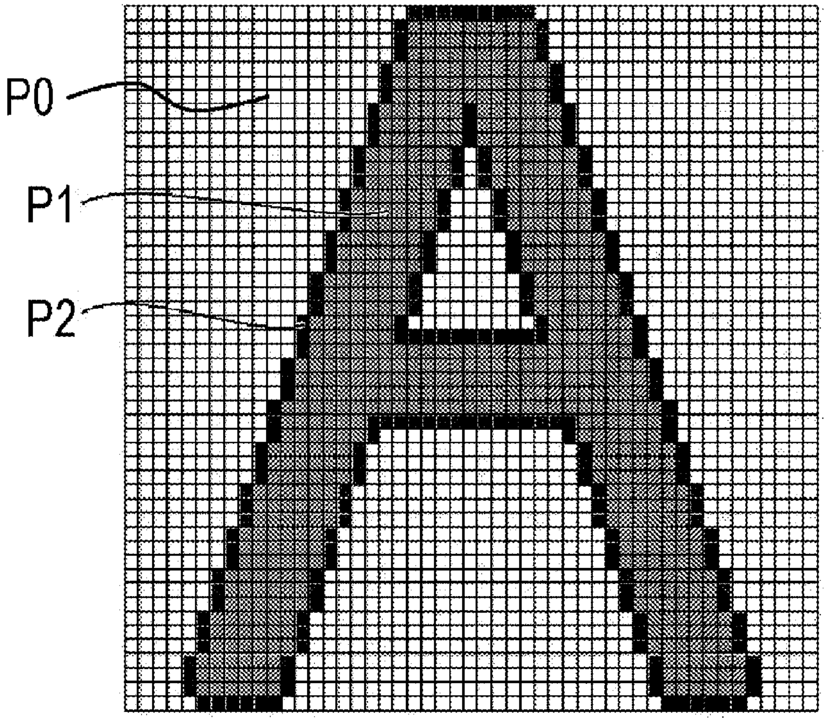

FIG. 5B is a schematic diagram illustrating image data after expansion processing is performed on the pixel data constituting the character "A" illustrated in FIG. 5A. As illustrated in FIG. 5B, as an example of the expansion processing, the image processing portion 303 changes image data such that, among the non-image portion pixels P0 included in the formation region of the character "A" in the image, non-image portion pixels P0 adjacent to the image portion pixels P1 are replaced with image portion pixels P2. The image portion pixels P2 are pixels constituting the character "A" together with the image portion pixels P1. A gradation value of the image portion pixel P2 may be the same as a gradation value of the image portion pixel P1, or may be different.

By performing image processing such that the periphery of a black image portion is exposed by the exposure apparatus 10 as in the present example, when the low-image coverage support mode is selected, the toner consumption amount in a black image portion can be increased without increasing density of a halftone image portion.

In the present example, when the low-image coverage support mode is selected, in addition to the operation in the low-image coverage support mode in Example 1, image processing (expansion processing) is performed by the image processing portion 303 such that the periphery of a black image portion is exposed by the exposure apparatus 10, but the configuration is not limited thereto. For example, when the low-image coverage support mode is selected, only image processing in which the periphery of a black image portion is exposed by the exposure apparatus 10 may be performed by the image processing portion 303 without reducing the peripheral velocity or increasing the exposure intensity of the photosensitive drum 1 as in Example 1.

In the selection of the low-image coverage support mode, how to set the range of the periphery of a black image portion to be exposed by the exposure apparatus 10 is preferably set by the image processing portion 303 depending on image quality of a text image or a line image and a toner consumption amount increase rate. The specific methods of expansion processing described above are merely an example, and instead of the above-mentioned methods, various kinds of conventionally known image processing may be employed as appropriate as long as image processing can increase the toner consumption amount in the low-image coverage support mode as compared to the normal mode.

In the present example, the apparatus configuration of a contact development type in which the photosensitive drum 1 and the developing roller 4 contact each other to form a developing portion has been described, but the present invention is also applicable to a non-contact development type image forming apparatus. Specifically, the present invention is also applicable to an image forming apparatus in which the photosensitive drum 1 and the developing roller 4 do not contact each other, closest opposed portions of the photosensitive drum 1 and the developing roller 4 form a developing portion, and development is performed by causing toner to fly from the developing roller 4 to an electrostatic latent image on the peripheral surface of the photosensitive drum 1.

Furthermore, in the present example, what is called a monochrome type image forming apparatus, that is, an image forming apparatus including a single image forming portion has been exemplified, but the image forming apparatus to which the present invention is applicable is not limited thereto. For example, the present invention is preferably applied to what is called a full-color type image forming apparatus, that is, an image forming apparatus including a plurality of image forming portions. Differences in apparatus configuration between a monochrome image forming apparatus and a color image forming apparatus include differences in color and the number of colors of an image to be formed. Specifically, a monochrome image forming apparatus can form an image in a single color (typically, black), but a color image forming apparatus can form an image in a freely selected hue by superimposing a plurality of developer images with different colors. Furthermore, in an intermediate transfer type color image forming apparatus, a developer image is first transferred from a photosensitive member as an image bearing member to an intermediate transfer member (also referred to as second image bearing member) as a first transferred member, and is transferred from the intermediate transfer member to a recording material as a second transferred member. On the other hand, in a monochrome image forming apparatus and a direct-transfer type color image forming apparatus, a developer image is directly transferred to a recording material from a photosensitive member.

The configurations and the control methods in the above-mentioned examples can be combined as much as possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-141754, filed on Aug. 31, 2023, which is hereby incorporated by reference herein in its entirety.

What is claimed is:

1. An image forming apparatus, comprising:

a photosensitive drum configured to rotate;

a charging roller configured to come into contact with the photosensitive drum to charge a surface of the photosensitive drum;

a charging voltage power source configured to apply a charging voltage to the charging roller;

an exposure apparatus configured to expose the surface of the photosensitive drum to form an electrostatic latent image on the surface of the photosensitive drum;

developing chamber configured to contain developer therein;

a developer bearing member configured to bear the developer contained in the developing chamber, the developer bearing member being configured to rotate and supply the developer to the surface of the photosensitive drum;

a drive controller configured to drive the photosensitive drum and the developer bearing member; and a control portion configured to control the drive controller, the charging voltage power source, and the exposure apparatus, wherein the image forming apparatus transfers a developer image, which is obtained by developing the electrostatic latent image by using developer borne by the developer bearing member, onto a recording material to form an image on the recording material, and wherein the control portion is capable of executing following modes:

a first operation mode for rotating the photosensitive drum at a first peripheral velocity, the first operation mode being a mode in which the exposure apparatus exposes the surface of the photosensitive drum with a first exposure intensity; and a second operation mode for rotating the photosensitive drum at a second peripheral velocity lower than the first peripheral velocity, the second operation mode being a mode in which the exposure apparatus exposes the surface of the photosensitive drum with a second exposure intensity higher than the first exposure intensity.

2. The image forming apparatus according to claim 1, wherein, in regard to an image coverage that is a proportion of a developer image to an image formable region of a recording material, the image coverage in the second operation mode is lower than the image coverage in the first operation mode.

3. The image forming apparatus according to claim 2, further comprising an acquisition controller configured to acquire the image coverage before image forming operation is performed, wherein the control portion is configured to:

execute the image forming operation in the first operation mode in a case where the image coverage acquired by the acquisition controller is higher than a predetermined image coverage; and execute the image forming operation in the second operation mode in a case where the image coverage acquired by the acquisition controller is equal to or lower than the predetermined image coverage.

4. The image forming apparatus according to claim 1, wherein, in regard to a peripheral velocity ratio that is a ratio of a peripheral velocity of the developer bearing member to a peripheral velocity of the photosensitive drum, the peripheral velocity ratio in the first operation mode and the peripheral velocity ratio in the second operation mode are equal to each other.

5. The image forming apparatus according to claim 1, wherein, in regard to a peripheral velocity ratio that is a ratio of a peripheral velocity of the developer bearing member to a peripheral velocity of the photosensitive drum, the peripheral velocity ratio in the second operation mode is smaller than the peripheral velocity ratio in the first operation mode.

6. The image forming apparatus according to claim 1, wherein the image forming apparatus has, as gradation tables used for gradation correction of image data to be used for forming an image:

a first gradation table used in the first operation mode; and a second gradation table used in the second operation mode, and wherein, in regard to same input data, density of output data in a case where the second gradation table is used is lower than density of output data in a case where the first gradation table is used.

7. The image forming apparatus according to claim 1, further comprising an image processing controller configured to process, in the second operation mode, image data such that, among non-image portion pixels included in a formation region of a text or a line in the image, a non-image portion pixel adjacent to an image portion pixel is replaced with an image portion pixel.

8. The image forming apparatus according to claim 1, further comprising an input module configured to receive input of selection of an operation mode used for image forming operation from a user.

9. The image forming apparatus according to claim 1, wherein the image forming apparatus is configured such that developer that has not been transferred to the recording material but remains on the photosensitive drum is collectable in the developing chamber through the developer bearing member.

10. The image forming apparatus according to claim 1, wherein, in regard to a light amount per unit area of laser light that is applied to the surface of the photosensitive drum by the exposure apparatus, the light amount in the second operation mode is larger than the light amount in the first operation mode.

11. The image forming apparatus according to claim 1, wherein, in regard to a potential difference on the photosensitive drum between an image portion potential formed by exposure of the exposure apparatus and a non-image portion potential, the potential difference in the second operation mode is larger than the potential difference in the first operation mode.

12. The image forming apparatus according to claim 1, wherein the developer bearing member is configured to come into contact with the photosensitive drum to supply developer to the surface of the photosensitive drum.

* * * * *